(No Model.)
2 Sheets—Sheet 1.

J. R. ALLEN.
LOG BOOM.

No. 311,865. Patented Feb. 10, 1885.

WITNESSES.
E. E. Sickler.
J. F. Sawyer.

INVENTOR.
John R. Allen
By C. F. Jacobs
Atty.

(No Model.) 2 Sheets—Sheet 2.

J. R. ALLEN.
LOG BOOM.

No. 311,865. Patented Feb. 10, 1885.

WITNESSES.
E. E. Sickler.
J. W. Sawyer.

INVENTOR.
John R. Allen
By C. F. Jacobs
Atty.

UNITED STATES PATENT OFFICE.

JOHN R. ALLEN, OF INDIANAPOLIS, INDIANA.

LOG-BOOM.

SPECIFICATION forming part of Letters Patent No. 311,865, dated February 10, 1885.

Application filed November 13, 1884. (No model.)

*To all whom it may concern:*

Be it known that I, JOHN R. ALLEN, a resident of Indianapolis, Marion county, Indiana, have made certain new and useful Improvements in Log-Booms, a description of which is set forth in the following specification, reference being made to the accompanying drawings, in the several figures of which like letters indicate like parts.

My invention relates to the construction of what are known as "log-booms," and is designed to catch and hold in suitable inclosing sections logs drifted down by river-currents, and will be understood by persons skilled in the art from the following description.

Figure 1:
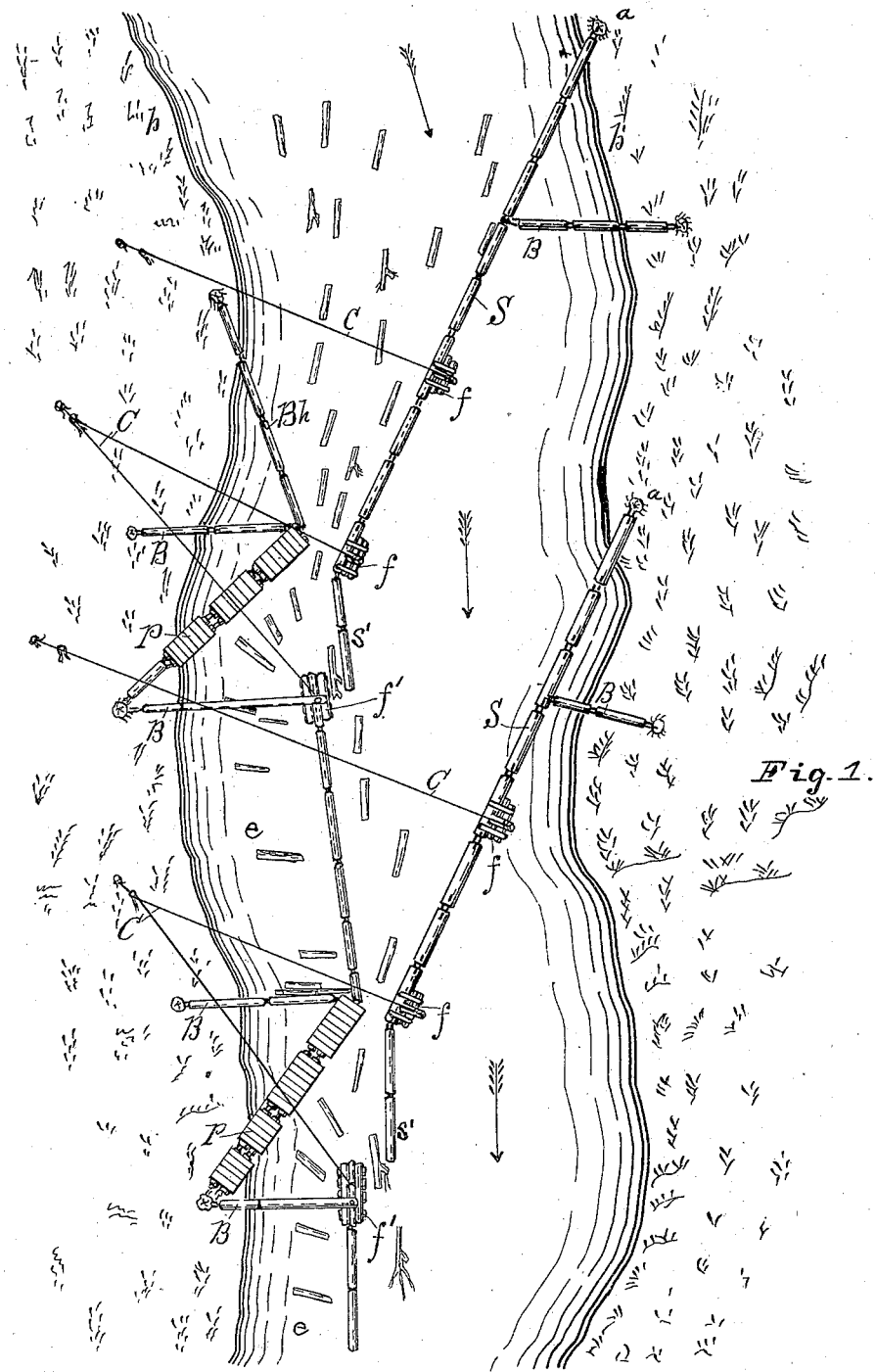
Figure 3:
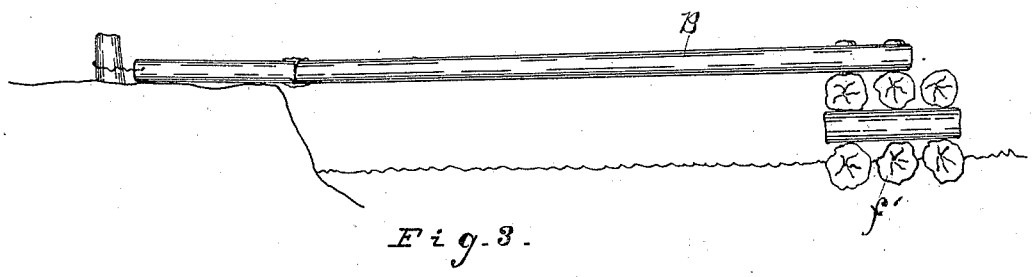
Figure 2:
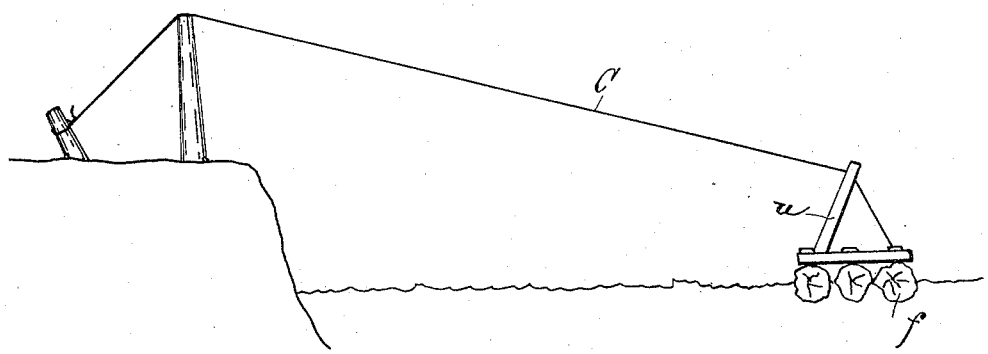

In the drawings, Figure 1 represents a plan view of my boom as arranged during the actual operation of catching logs and passing the drift, showing the whole of the first and the head of a second section. Fig. 3 is a detail or side view of one of the floats, $f'$, and the brace B, formed of one or more logs, holding it in position; and Fig. 2 is a side view of one of the smaller floats $f$, in which the upright $u$ is formed, and over which the cable $c$ is passed, connecting with trees or posts on the river-bank. Figs. 2 and 3 are drawn upon a larger scale than Fig. 1.

In detail, S is a sheer attached to bank $b'$ by an anchor, $a$, of some kind, a tree or post being preferable. This sheer is held in a slanting direction across the stream by cables $c$ $c$, attached at one end to the sheer by means of uprights $u$, which are framed into a widened portion of the sheer, as shown in Fig. 2, and at the other end to posts or trees on the bank $b$, as also shown in Fig. 2. This sheer is made of logs fastened end to end, and the part S', below the second float $f$, is arranged so as to be swung up, when desired, against the end of float $f'$, closing the opening.

B is a brace made of one or more logs, and is used to hold the part of the boom with which it is connected out and away from the bank to which the other end of the brace is fastened. It may be said here, once for all, that all the fastenings made to either bank, whether of cables or braces, are to be so made as to be adjustable as to height above the river-level, so that in case of high water or low water the whole boom will float on the water easily without straining or breaking any of the shore-fastenings. Opposite the lower end of the upper sheer is a bulk-head, B$h$, made of logs, the lower half of which is planked over, so as to form a platform, P, on which the boom-hands may stand while sorting. The angle of this bulk-head projects into the stream, as shown in Fig. 1, and thus a narrow gate or opening is formed between this point and the sheer and its float $f$, the sheer on one side and the upper half of the bulk-head B$h$ on the other forming a mouth or funnel, the current thus forcing all the logs and drift through its narrow mouth, already described. As the logs pass this point the sorters, with their pikes, standing on platform P, have but to slightly turn the log in a direction partly across the current, when the latter will complete the turning itself and force the log further about and down under brace B of float $f'$ into the inclosure $e$, formed by the inclosing parts of the inclosure $e$, the upper part of which is nearly straight with the current, as shown, instead of being slanted to form a funnel-mouth, as in the case of the bulk-head of the upper or first section of the boom. The brace B, connecting float $f'$ with the bank $b$, is elevated high enough above the water-level to allow the logs to pass under easily into the inclosure $e$, and this elevation is secured by the construction of float $f'$, it being made of several cross-tiers of logs, as shown in Fig. 3. I thus provide a sheer for each section of the boom, and dispense with trails and side gaps therein, and with a double line of pockets on each side of the channel, booms having these features being well known. My boom may be used with the upper section alone, or in combination with one or more lower sections. The lower platform, P, is of course not used when but one section is constructed; but each succeeding section will be constructed like the second one shown in Fig. 1, the upper section alone having the broad funnel-shaped mouth formed by the convergence of the upper portion of the bulk-head and the opposite sheer. The lower portion of each sheer S' is adapted to swing up close against float $f'$, as described, and the drift is allowed to escape through the opening, as shown in Fig. 1, and passes down. When a second or third section is used, the logs that escape from the workmen on the upper section may be caught at one of the sheers and turned into the inclosure below, and in working large lots of logs several sections of boom are often necessary, especially when the floods are up and the current is swift, and heavy. The relative arrangement of the parts comprising the boom may need to be varied in construction, and must always be adapted to the bend and current of the stream and banks thereof, and so long as the principle of my device is preserved I do not intend to limit myself to the particular construction shown. The whole boom must be so constructed that it will float and ride without undue strain, rising with high and falling with low water. The lower platform, P, is for the workmen to stand upon while catching logs that have passed the upper section.

What I claim, and desire to secure by Letters Patent, is the following, viz:

1. A boom constructed substantially of logs, the head composed of a sheer on one side and a floating bulk-head on the other, the two converging to form a narrow mouth, in combination with a floating section for inclosing logs below the head, the lower part of the bulk-head provided with a working-platform, all secured to the respective banks of the stream, substantially as and for the purpose described.

2. A boom for catching logs, composed of a head formed of a sheer on one side and the upper portion of a floating bulk-head on the other, the two converging toward each other to form a narrowed mouth which opens in the line of the mouth of an inclosing section below for retaining the logs, in combination with such lower inclosing section, whereby the current is directed to force the logs from the mouth of the head into the opening of the inclosing section below, substantially as described.

3. The log-boom herein described, whose head is formed of a sheer, S, and floating bulk-head B$h$, the sheer braced out from the bank $b'$ by braces B, and held to the opposite bank by cables C, the lower part of the sheer, S', adapted to be swung out from or drawn toward the float $f'$ of the inclosure $e$, in combination with the inclosure $e$ and the float $f'$, substantially as described.

4. A log-boom composed of two or more sections connected with the river-bank on the same side, the upper section having its head formed of a sheer and a floating bulk-head, the sheer provided with floats and uprights for elevating the cables connecting said sheer with the opposite bank, an inclosing section for securing logs below the mouth of the boom-head, whose mouth is so arranged as to be substantially in line with the opening into the inclosing section, whereby the current may force the logs into such inclosure, all combined substantially as described.

5. A log-boom having its head composed of the sheer S and bulk-head B$h$, severally braced and held, as described, to the two banks of the river and converging to form a narrow mouth opposite the float $f$, the swinging section S', connected to the sheer below such float, and an inclosing section for retaining the logs passing through the mouth of the boom-head, whose opening is in such a line with the mouth of the boom-head that the force of the current may be utilized to direct the logs through the one into the opening of the other, all combined substantially as described.

6. In a log-boom, a floating sheer, S, anchored to the bank at its upper end and held in a slanting direction partly across the stream by means of cords and suitable braces, and provided with floats $f$ and uprights $u$, framed in the floats, and a swinging end, S', in combination with a floating bulk-head, B$h$, the two converging toward each other to form a narrow mouth for the passage of the logs, all combined substantially as described.

7. A log-boom having a head formed of the sheer S, provided with swing S' and floats $f$, in which uprights $u$ are framed, and the floating bulk-head B$h$ opposite, the two converging toward each other and forming a narrowed mouth, the inclosure $e$, for receiving and holding the logs which pass the mouth of the boom, the float $f'$ and its connected brace, and one or more lower sections comprising the platform P, the lower sheer, S, swing S', and the lower inclosing section, $e$, all combined and arranged to operate substantially as described.

In witness whereof I have hereto set my hand this 7th day of November, 1884.

JOHN R. ALLEN.

Witnesses:
C. P. JACOBS,
J. GOODNOUGH.